Inventor
THEODORE P. PAJAK,

Patented Sept. 2, 1952

2,609,068

UNITED STATES PATENT OFFICE 2,609,068

METAL FOIL HONEYCOMB CORE

Theodore P. Pajak, Baltimore, Md., assignor to The Glenn L. Martin Company, Middle River, Md., a corporation of Maryland Application March 11, 1949, Serial No. 80,955

9 Claims. (Cl. 189—34)

This invention relates to an improved structural material and, more particularly, to a material having a metal honeycomb core formed with indented and apertured cell walls including the method of making such material.

In the forming of a metallic cellular panel, in which surface sheets are placed transversely of cells formed from sheet material bonded together and to the sheets by an adhesive under heat and pressure the necessity of dissipating the vapors liberated by the bonding adhesive becomes a serious problem. Such vapors, if not readily dissipated, have a tendency to form bubbles that detract from the strength of the bond formed by the adhesive and create internal pressures sufficient to blister the surface sheets. These problems have been solved in the construction of the panel structure of this invention in which strips of foil are perforated to form ventilating means positioned and arranged for the dissipation of vapors liberated by the adhesive. The perforated metal foil strips of this invention are corrugated to provide flat surfaces disposed on each side of a median plane, which are then assembled together to form a unitary structure having a plurality of cells adhesively bonded together between surface sheets with the ends of the cells joined to the inner sides of the sheets. The perforations of the strips provide air passages leading from each bond area for the ready transmission of vapors from cell to cell and outwardly of the structure. Such ready transmission of the vapors as the adhesive is heated overcomes their tendency to form air bubbles in the bond areas and allows the vapors to pass out of the cells under self-generated pressures without affecting the structural arrangement of the cells or surface sheets.

The present invention provides a structural material having a light-weight core formed of indented and apertured metal foil strips corrugated and bonded together as a plurality of vented cells positioned between face sheets. The arrangement of the apertures of the metal foil strips assures the formation of complete uniform bonds throughout each bond area free of air bubbles and the liberation of solvents and polymerization products during the bonding operation. The arrangement of the indentations and apertures of this invention also allows for the uniform distortion of the cell edges of an assemblage used to produce a structure having curved panel areas wherein certain areas of the cell walls are caused to become disarranged as the cellular material is formed to the configuration of the inner surface of the curved panel without loss in shear rigidity nor an increase in weight.

It is among the objects of the present invention to provide a cellular structural material comprised of strips of metal foil having intervening bond areas apertured for the dissipation of gases and vapors bonded together at said areas to form a plurality of cells in a cellular assembly placed between surface sheets and bonded thereto.

Another object is to provide a structural material having surface sheets separated by a cellular core formed of apertured metal strips bonded together at spaced intervals.

Still another object is to provide a structural material having a metal cellular core formed of metal foil strips formed with surface irregularities wherein the rigidity of each strip is increased.

Another object is to provide a structural material having an assembly of vented cells formed of reinforced metal foil strips bonded together and between surface sheets formed of material having substantially the same coefficient of expansion as the cellular material.

A further object is to provide a rigid structural material having a cellular core assembly capable of affecting a permanent set in conformity with the curvature of curved surface sheets bonded thereto.

A still further object is to provide a method of making structural material comprised of strips of formed and apertured metal foil bonded together at spaced intervals with intervening apertured areas separated to provide a plurality of cells capable of dissipating gases and vapors therefrom with metal surface sheets placed transversely thereto and bonded to the ends of said cells.

Another object of this invention is to provide a method of forming reinforced, cellular, metallic structural material having a specific gravity of from .016 to .18.

Other objects of this invention will become apparent from the following description when taken in conjunction with the accompanying drawing in which like numbers refer to like parts in different views.

Figure 1:
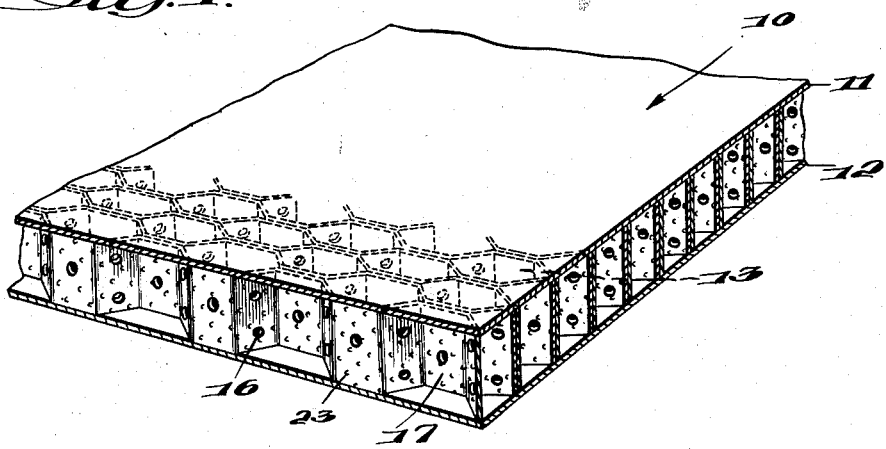
Figure 1 is a perspective view of a section of the cellular structure of this invention.

Referring more specifically to the drawing in Figure 1, I have illustrated a section of the cellular structure of this invention constructed as a flat panel for use as a flooring material or a like application where a flat panel would be suitable. The panel 10 consists of a top sheet 11 and a bottom sheet 12 of aluminum alloy or like material held separated by a cellular core in which a plurality of hexagonal cells 13 are formed from strips 17 of metal foil. The ends of each cell 13 are bonded to the inner surfaces of the top and bottom sheets 11 and 12 respectively, placed transversely thereto.

Uniformly spaced transversely and longitudinally of each of the strips 17 are indentations 23 formed as deformations in the strip surface. The function of these indentations is to add rigidity to the strips 17 which not only aids in working the material but also increases the strength of the finished structure. The need for additional rigidity of the strips 17 depends greatly on the application and whether or not a heat treated or a non-treated foil is to be used. I have found that fully hardened aluminum foil of from .001 to .006 of an inch in thickness, uniformly corrugated or indented with deformations having a depth of from .003 to .030 of an inch, spaced approximately .100 of an inch apart, provides a foil strip 17 having superior strength and rigidity characteristics.

Figure 2:
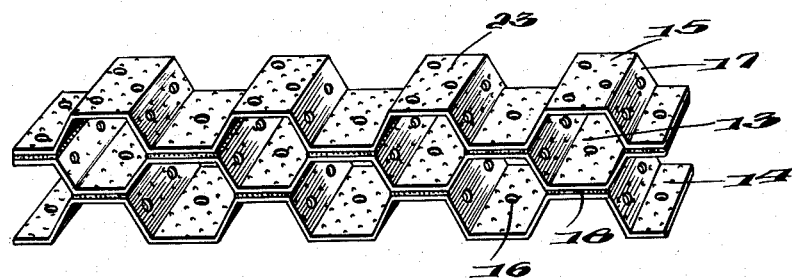
Figure 2 is a fragmentary perspective view of the core construction showing the vented and indented formation of the foil strips.

A suitable foil material is cut to the desired width and apertured or perforated to provide holes 16 of approximately 1/16 of an inch in diameter on approximately 1/4 of an inch centers as best illustrated in Figure 2. In the making of cellular material in which the cells are to be formed to approximately 3/8 of an inch in diameter, the material is corrugated to provide ridge areas 15 at each side of the median plane of the strip 17 on centers of approximately 1/8 of an inch. It is apparent, of course, that these dimensions are illustrative and that the dimensions of the corrugation ridge and intervening areas are to be determined so that the width of each cell 13, formed hexagonally between each pair of corrugations in the strip 17, can be calculated to produce the most efficient structure in the final assembly. The spacing of the apertures 16 is arranged so as to provide vents in each of the corrugated and intervening area so as to facilitate the uniform dissipation of vapors and gases originating within the core during the molding and bonding operation.

In the forming of the core material the outside surface of each ridge area 15 to be joined together by bonding is covered with a fairly heavy coating of thermosetting adhesive suitable for bonding metal surfaces. It is to be understood, of course, that in the forming of a core, different types of adhesives may be used as well as other forms of bonding, such as soldering, brazing, or welding; however, any method that would have a tendency to increase the weight should be avoided.

The next step is to partially cure the adhesive by preheating only sufficiently to fix the adhesive in a prebonded state. It was formerly considered necessary that this step eliminate all of the residual solvent from the adhesive in view of the fact that escape of the solvent during the final bonding would prove impractical. The apertured form of the strips 17 of this invention allows for such escape of the solvent without presenting any difficulty, and this fact is taken advantage of in the present invention to attain a higher speed of forming. In the present method of forming a core material, a preheating period of approximately 45 seconds at 300° F. has been satisfactory. A sufficient number of strips 17 to form a core of the desired width are stacked together with the coated outside surfaces of the flat ridge areas 15 separated by the adhesive bond material 18. Bonding of the material is then completed by the application of heat for approximately twenty minutes at substantially 300° F. with the assembly of strips held together under sufficient pressure to provide a close juncture between the strips at the bond area as best shown in Figure 2. The core material so formed as an assembly of cells 13 extending between the bonded strips 17 is then ready for further processing.

The desired thickness of core material for use between metal surface sheets 11 and 12 is cut from the assembly of strips by sawing or sanding by means of any of the conventional tools common to woodworking. Inasmuch as most of the structural material presently formed from core material of this type is approximately 1/2 of an inch in thickness, it is apparent that an assembly of approximately 18 inches in width will provide a relatively large number of slices for use in the final assembly of panel stock.

The next step in manufacturing the panel 10 is to coat one side of each of the surface sheets 11 and 12 with the thermosetting adhesive. A coating of the same adhesive is applied to the cellular ends of the core material either by a process of brushing, dipping or other means of contactual engagement with an adhesive applicator of conventional design. These coatings are then partially cured by preheating of the coated parts either with a bank of heating units or a like heating means after which the surface sheets are bonded to the cellular core material by subjecting the assembly, shown in Figure 1, to heat and pressure in a conventional type of mold or oven. No special provision need be made for the liberation of the vapors created while heating the material as these vapors are readily dissipated outwardly of the core material through apertures 16, uniformly placed throughout the material.

Although I have made reference to certain dimensions applicable to cellular material, generally I have found that to efficiently stabilize metal face sheets of various thicknesses, the ratio of the thickness of the face sheet as to the cell size is important to the weight-strength ratio, the stress at failure of such a structure is proportional to the square of this ratio. Therefore, in applying this teaching to the production of the present panel, it is to be found that the most efficient structure is to be attained by the use of a cell size having a width of from 16 to 25 times the face sheet thickness and having a range of from .06 to .18 in specific gravity.

Figure 3:
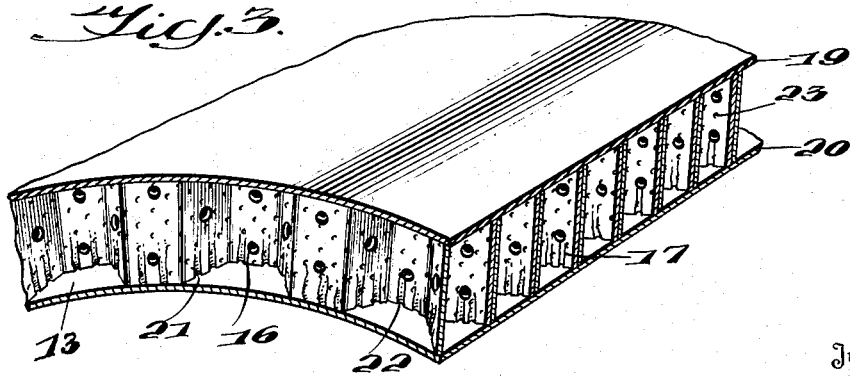
Figure 3 is a perspective view of a section of the cellular structure having curved surface sheets showing the folded formations developed in the cell walls.

In Figure 3 is illustrated the material of the present invention used in a panel having a curved surface wherein the core assembly is required to be deformed to follow the configuration of the curved surface. This formation of the core material, to conform with the inner surface of a curved face sheet 19 as well as the convex curvature of the bottom sheet 20, is readily accomplished due to the formability of the foil strips 17 bonded together as previously described and shaped to the same curvatures as the sheets. The walls of the cells 13 are merely folded back or reshaped on the inside of the radius or next to the inside surface of the bottom sheet 20 to allow for the difference in radii between the two surfaces with the metal foil taking the desired set. In such a formation, the top periphery of each cell remains substantially the same and the bottom periphery is reduced due to the compressive force applied to the cell walls next to the bottom sheet 20. The tendency of the foil to crinkle into wrinkles 21 extending laterally of the cell walls is thereby taken advantage of to produce the desired structure. The ends of the cell walls placed adjacent the bottom sheet 20 are also folded over as reentrant areas 22 which adds to the bond areas attainable between the curved bottom sheet 20 and the adjacent ends of the cell walls.

While I have illustrated and described with particularity the forming of a panel structure according to my invention, it will be appreciated that certain changes, alterations, modifications and substitutions can be made without departing from the spirit and scope of the appended claims.

I claim as my invention:

1. A cellular structural material comprising a pair of metal surface sheets separated by a cellular core formed of aluminum foil strips bonded together at spaced intervals with intervening spaces separated to form a plurality of cells, said strips being formed with a plurality of apertures extending therethrough for liberating vapors and gases from within each said cell with the ends of said cells being adhesively joined to the surface sheets by a thermosetting resin to form a vented unitary structure.

2. A cellular structural material comprising metal surface sheets separated by and adhesively bonded by a thermosetting resin to a cellular core formed of a plurality of metal foil strips arranged edgewise between said sheets and each having bond areas displaced from a median plane with intervening areas separated so as to form hexagonal cells, said strips being formed with apertures arranged as air passages leading from each said cell for the passage of gases liberated at said bond areas during the bonding of the material under heat and pressure.

3. A cellular structural material comprising metal surface sheets separated by and adhesively bonded under heat and pressure to a cellular core structure, said core being formed with a plurality of perforated aluminum foil strips each being corrugated to form bond areas displaced on each side of a median plane with the intervening areas of said strips forming hexagonal cells, said perforations in the strips venting each said cell so as to provide for liberation of gases and vapors formed by the adhesive during the bonding operation.

4. A cellular structural material comprising a cellular core of metal foil strips formed with a plurality of surface indentations spaced longitudinally and transversely of said strips as a stiffening means and adhesively bonded together at spaced areas displaced from the median plane of each strip to form hexagonal cells, vent means for each cell and bond area comprised of apertures formed in each strip forming air passages leading from the cells with the ends of said cells bonded to the inner surfaces of face sheets to form a unitary structure.

5. A cellular core for use in a structural panel having face sheets separated by a core comprising a plurality of aluminum foil strips having spaced perforations extending therethrough as vent means, said strips being formed with transverse ridges placed back to back to form a plurality of cells having ends adapted for bonding to the inner surfaces of the face sheets placed thereacross.

6. A cellular construction comprising a plurality of metal foil strips formed with bond areas spaced between intervening areas and displaced from the median plane of each strip and bonded together by a thermosetting adhesive to form a plurality of cells, vent means for said bond areas consisting of apertures formed in the strips at the bond areas and the intervening areas positioned and arranged to form air passages leading outwardly of the cells for the liberation of gases and vapors formed at said bond areas.

7. A method of constructing a structural comprising the steps of indenting a strip of metal foil to add rigidity thereto, perforating said strip with vent holes for the passage of gases therethrough, corrugating said foil transversely to form alternately raised and depressed areas displaced from the median plane of the strip to provide ridge-like bond areas spaced at each side of the median plane of each strip, cutting the formed strip into sections, coating said bond areas with an adhesive, positioning the strips with the coated bond areas together with the depressed areas spaced opposite each other to form hexagonal cells, bonding said cells together to form a core unit, coating one side of each of a pair of metal surface sheets adapted for engagement with the ends of said cells of the core unit with an adhesive, positioning the coated areas of the surface sheets across the cell ends and bonding the core unit and surface sheets together as a unitary structure with the gases liberated by the adhesive being vented through said vent holes to the exterior of the structure.

8. A method of constructing a structural panel comprising the steps of perforating said strip with vent holes for the passage of gases therethrough, corrugating said foil transversely to form alternately raised and depressed areas displaced from the median plane of the strip to provide ridge-like bond areas spaced at each side of the median plane of each strip, cutting the formed strip into sections, coating said bond areas with an adhesive, positioning the strips with the coated bond areas together with the depressed areas spaced opposite each other to form hexagonal cells, bonding said cells together to form a core unit, coating one side each of a pair of metal surface sheets adapted for engagement with the ends of said cells of the core unit with an adhesive, positioning the coated areas of the surface sheets across the cell ends bonding the core unit and surface sheets together as a unitary structure with the gases liberated by the adhesive being vented through said vent holes to the exterior of the structure.

9. A sandwich panel structure comprising a pair of reinforcing sheets and a plurality of perforated aluminum foil strips interposed edgewise therebetween, said strips being corrugated so as to provide abutting crests extending generally normal to the plane of said sheets whereby to form a cellular core, said strips being bonded to their adjacent strips at said abutting crests and to said sheets with a thermosetting adhesive to form a unitary structure, said perforations in said strips venting each cell whereby to permit the escape of gases generated by said adhesive.

THEODORE P. PAJAK.

REFERENCES CITED

The following references are of record in the file of this patent:

UNITED STATES PATENTS

| Number | Name | Date |
|---|---|---|
| 1,389,294 | Dean | Aug. 30, 1921 |
| 1,754,784 | Borsodi | Apr. 15, 1930 |
| 1,996,490 | Romanoff | Apr. 2, 1935 |
| 2,050,074 | Trytten | Aug. 4, 1936 |
| 2,056,563 | Budd et al. | Oct. 6, 1936 |
| 2,385,352 | Davis | Sept. 25, 1945 |
| 2,428,979 | May | Oct. 14, 1947 |
| 2,477,852 | Bacon | Aug. 2, 1949 |
| 2,512,875 | Reynolds | June 27, 1950 |